United States Patent
Kroeger

[11] Patent Number: 6,148,007
[45] Date of Patent: Nov. 14, 2000

[54] METHOD FOR DATA TRANSMISSION IN A DIGITAL AUDIO BROADCASTING SYSTEM

[75] Inventor: Brian William Kroeger, Sykesville, Md.

[73] Assignee: USA Digital Radio Partners, L.P., Linthicum, Md.

[21] Appl. No.: 09/049,216

[22] Filed: Mar. 27, 1998

[51] Int. Cl.[7] .............................. G08G 15/00; H04J 1/00
[52] U.S. Cl. .................... 370/480; 370/203; 370/208; 370/210
[58] Field of Search .................... 370/203, 208, 370/210, 480, 481, 482

[56] References Cited

U.S. PATENT DOCUMENTS

| | | | |
|---|---|---|---|
| 5,278,826 | 1/1994 | Murphy et al. | 371/76 |
| 5,278,844 | 1/1994 | Murphy et al. | 370/37.1 |
| 5,315,583 | 5/1994 | Murphy et al. | 370/18 |
| 5,416,801 | 5/1995 | Chouly et al. | 375/260 |
| 5,465,396 | 11/1995 | Hunsinger et al. | 455/61 |
| 5,588,022 | 12/1996 | Dapper et al. | 375/216 |
| 5,633,896 | 5/1997 | Carlin et al. | 375/340 |
| 5,673,292 | 9/1997 | Carlin | 375/269 |
| 5,867,478 | 2/1999 | Baum et al. | 370/203 |
| 6,005,840 | 12/1999 | Awarter et al. | 340/206 |

FOREIGN PATENT DOCUMENTS 9749207  12/1997  WIPO .

OTHER PUBLICATIONS

B. Kroeger, A. Vigil, "Improved IBOC DAB Technology For AM and FN Broadcasting", Oct. 1996.
M. Alard, R. Lassale, "Principles of modulation and channel coding for digital broadcasting for mobile receivers", EBU Review, No. 224, pp. 168–190, Aug. 1987.

*Primary Examiner*—Ajit Patel
*Assistant Examiner*—Hanh Nguyen
*Attorney, Agent, or Firm*—Robert P. Lenart; Eckert Seamans Cherin & Mellott, LLC

[57] ABSTRACT

A method of broadcasting digitally encoded information includes the transmission of a plurality of orthogonal frequency division multiplexed sub-carriers. The sub-carriers are modulated by a digitally encoded signal representative of data to be transmitted, with the digitally encoded signal including a plurality of symbols having varying phase and amplitude components. The amplitude modulation can vary between two or more levels. Portions of the digitally encoded signal may be differentially imposed across the sub-carriers. The method also includes receiving the sub-carriers, demodulating the sub-carriers to recover the digitally encoded signal, and decoding the digitally encoded signal.

7 Claims, 1 Drawing Sheet

METHOD FOR DATA TRANSMISSION IN A DIGITAL AUDIO BROADCASTING SYSTEM

BACKGROUND OF THE INVENTION

This invention relates to radio broadcasting, and more particularly, to modulation formats for increasing data capacity in Digital Audio Broadcasting (DAB) systems utilizing a orthogonal frequency division multiplexing.

Digital Audio Broadcasting is a medium for providing digital-quality audio, superior to existing analog broadcasting formats. Both AM and FM DAB signals can be transmitted in a hybrid format where the digitally modulated signal coexists with the currently broadcast analog AM or FM signal, or in an all-digital format without an analog signal. In-band-on-channel (IBOC) DAB systems require no new spectral allocations because each DAB signal is simultaneously transmitted within the same spectral mask of an existing AM or FM channel allocation. IBOC promotes economy of spectrum while enabling broadcasters to supply digital quality audio to their present base of listeners. Several IBOC DAB approaches have been suggested. One such approach, set forth in U.S. Pat. No. 5,588,022, presents a method for simultaneously broadcasting analog and digital signals in a standard AM broadcasting channel. Using this approach, an amplitude-modulated radio frequency signal having a first frequency spectrum is broadcast. The amplitude-modulated radio frequency signal includes a first carrier modulated by an analog program signal. Simultaneously, a plurality of digitally-modulated carrier signals are broadcast within a bandwidth which encompasses the first frequency spectrum. Each digitally-modulated carrier signal is modulated by a portion of a digital program signal. A first group of the digitally-modulated carrier signals lies within the first frequency spectrum and is modulated in quadrature with the first carrier signal. Second and third groups of the digitally-modulated carrier signals lie outside of the first frequency spectrum and are modulated both in-phase and in-quadrature with the first carrier signal. Multiple carriers are employed by means of orthogonal frequency division multiplexing (OFDM) to bear the communicated information.

FM IBOC broadcasting systems using have been the subject of several United States patents including U.S. Pat. Nos. 5,465,396; 5,315,583; 5,278,844 and 5,278,826. In addition, a commonly assigned pending patent application for a "Method and System for Simultaneously Broadcasting and Receiving Digital and Analog Signals, by D. Kumar and B. Hunsinger, Ser. No. 08/294,140, filed July 1994 discloses an FM IBOC DAB system. These FM IBOC DAB systems utilize a plurality of OFDM sub-carriers to transmit digitally encoded audio and data signals.

One way in which data can be encoded for transmission is amplitude-shift-keying (ASK) in which the amplitude of a carrier is varied in accordance with the level of the data. Another way to encode data is to designate an array of data points in a complex plane and then assign each of these points to represent a particular pattern of digital information, or symbol. These data points can be described by either real and imaginary, or phase and amplitude, numbers. Each such array of data points is called a constellation. Using this encoding scheme, a received signal can be related to specific symbols in the constellation, and identified with the original information transmitted. Phase-shift-keying (PSK) is such an encoding scheme, in which the modulating function shifts the instantaneous phase of the carrier among predetermined discrete symbols. The information, therefore, can reside in the phase of the carrier. From the perspective of noise immunity, coherent PSK can be superior to other schemes. Modulated signals can carry information in the symbol's amplitude as well as its phase, further increasing the information carried by any particular symbol. However, in practice, the number of symbols able to be clustered into a particular constellation is limited by factors such as symbol rate and channel distortion. Factors such as thermal noise, intersymbol interference, random and non-linear channel effects, and the like, (collectively, "distortion") can corrupt both the phase and the amplitude of the transmitted signal waveform, thereby tending to reduce the separation between neighboring symbols.

In IBOC DAB systems which operate channels that span a limited range of frequencies, it is desirable to utilize modulation formats that can deliver sufficient data throughput to provide acceptable audio quality and/or data delivery. This invention seeks to increase the data capacity of such DAB systems.

SUMMARY OF THE INVENTION

This invention provides method of broadcasting digitally encoded information comprising the steps of: generating a plurality of orthogonal frequency division multiplexed sub-carriers; producing a digitally encoded signal representative of data to be transmitted, with the digitally encoded signal including a plurality of symbols having pulse shapes s(t) defined as $$s(t) = \sum_{k=0}^{K-1} a(k) \cdot m(k) \cdot e^{j(2\pi \cdot k \cdot f_s t + \theta(k) + d(k) \cdot \pi/2)} \cdot p(t),$$

where k is a sub-carrier index, p(t) is a pulse shape, a(k) is an amplitude scaling factor, θ(k) is a phase angle, $f_s$ is a sub-carrier spacing, and m(k) is an amplitude modulation factor. The phase angle and amplitude modulation factor are varied in response to the signal to be transmitted. The sub-carriers are modulated with the digitally encoded signal and broadcasting.

The amplitude modulation can vary between two or more levels. Portions of the digitally encoded signal may be differentially imposed across the sub-carriers. The invention further encompasses the steps of receiving the sub-carriers, demodulating the sub-carriers to recover the digitally encoded signal, and decoding the digitally encoded signal. The decoding step may include the steps of pulse shaping the digitally encoded signal to produce a pulse shaped signal, performing a fast Fourier transform of the pulse shaped signal to produce a code sequence, differentially detecting the code sequence to produce an output sequence, and determining a change in level between adjacent symbols in the output sequence to obtain data represented by amplitude modulation.

The invention also encompasses transmitters and receivers that operate in accordance with the above method. This invention provides an optional and adjustable add-on to an existing QPSK system.

DETAILED DESCRIPTION OF THE PREFERRED EMBODIMENTS

Figure 1:
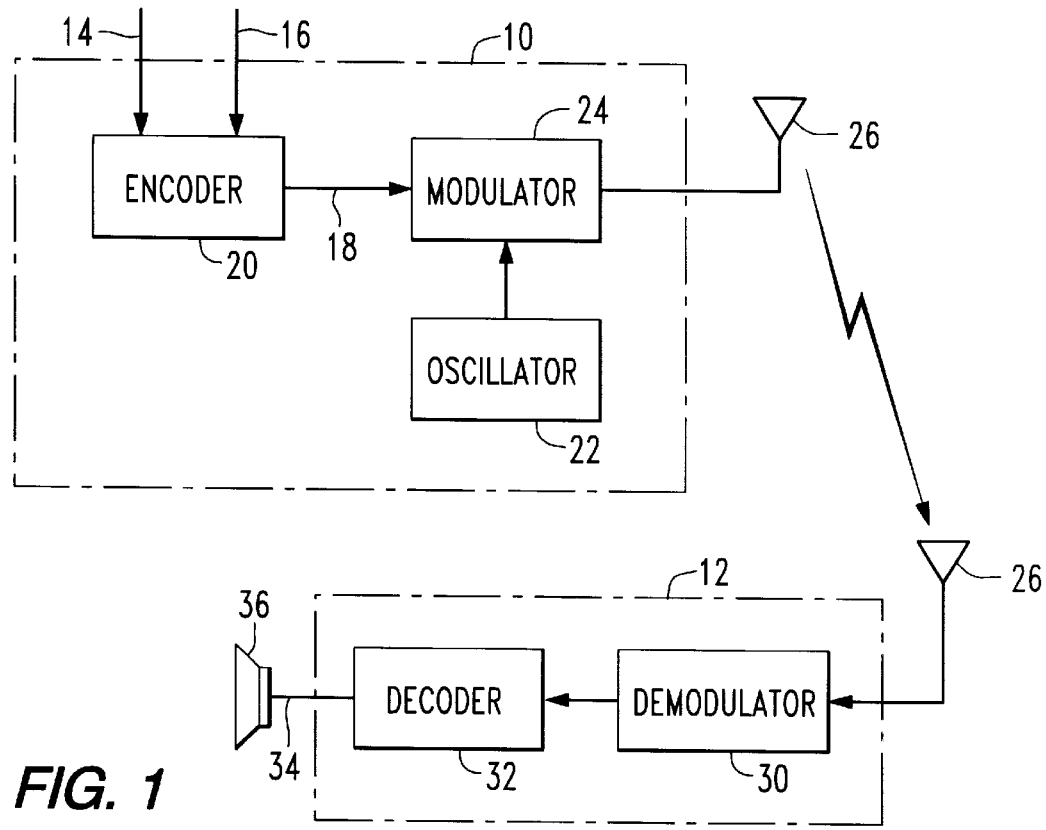
FIG. 1 is simplified block diagram of a digital audio broadcasting transmitter and receiver that can operate in accordance with the method of this invention.

Referring to the drawings, FIG. 1 is simplified block diagram of a digital audio broadcasting transmitter 10 and receiver 12 that can operate in accordance with the method of this invention. The transmitter includes inputs 14 and 16 for receiving signals representative of audio signals and/or data to be transmitted, hereinafter referred to generically as program material. The program material is converted to a digital signal, comprised of a plurality of symbols, on line 18 by an encoder 20. A plurality of sub-carriers are produced by oscillator 22 and delivered to modulator 24. The modulator uses orthogonal frequency division multiplexing to modulate that sub-carriers with the encoded signals. The signals are then transmitted through antenna 26 to the receiver.

The receiver 12 includes an antenna 28 for receiving the OFDM sub-carriers and a demodulator 30 for recovering the digital signal. A decoder 32 recovers the program material and produces an output on line 34 representative of the program material. That output can be fed to a speaker 36 for an audio output, or it can be fed to another suitable device, such as a visual display to display information contained in the program material.

The OFDM receiver is designed to detect symbols whose pulse shapes can be described as $$s(t) = \sum_{k=0}^{K-1} a(k) \cdot m(k) \cdot e^{j(2\pi \cdot k \cdot f_s t + \theta(k) + d(k) \cdot \pi/2)} \cdot p(t),$$

where k is the sub-carrier index, p(t) is the pulse shape, a(k) is an arbitrary amplitude scaling assumed to change little from sub-carrier to sub-carrier if no amplitude modulation is applied, $\theta(k)$ is an arbitrary phase angle also assumed to change little from sub-carrier to sub-carrier, $f_s$ is the sub-carrier spacing, and m(k) is the amplitude modulation imposed upon each symbol. The information is normally imposed differentially across the subcarriers (in frequency) as opposed to time in this selective fading case. s(t) is recognized as the inverse DFT of the complex sequence $a(k) \cdot m(k) \cdot e^{j \cdot d(k) \cdot \pi/2}$. A forward FFT performed at the receiver after matched pulse shaping results in the sequence $$x(k) = a(k) \cdot m(k) \cdot e^{j(\theta(k) + d(k) \cdot \pi/2)} + n(k)$$

where n(k) is a noise term received over the corrupted channel. Simple differential detection across the sequence results in an output sequence $$y(k) = a(k) \cdot a(k-1) \cdot m(k) \cdot m(k-1) \cdot e^{j(d(k) - d(k-1)) \cdot \pi/2} + n'(t)$$

The information contained phase term of y(k) is decoded through well-known techniques. The detection process used in receivers employing this invention is similar to that found in prior art receivers when no modulation is imposed upon the signal and m(k)=1.

Figure 2:
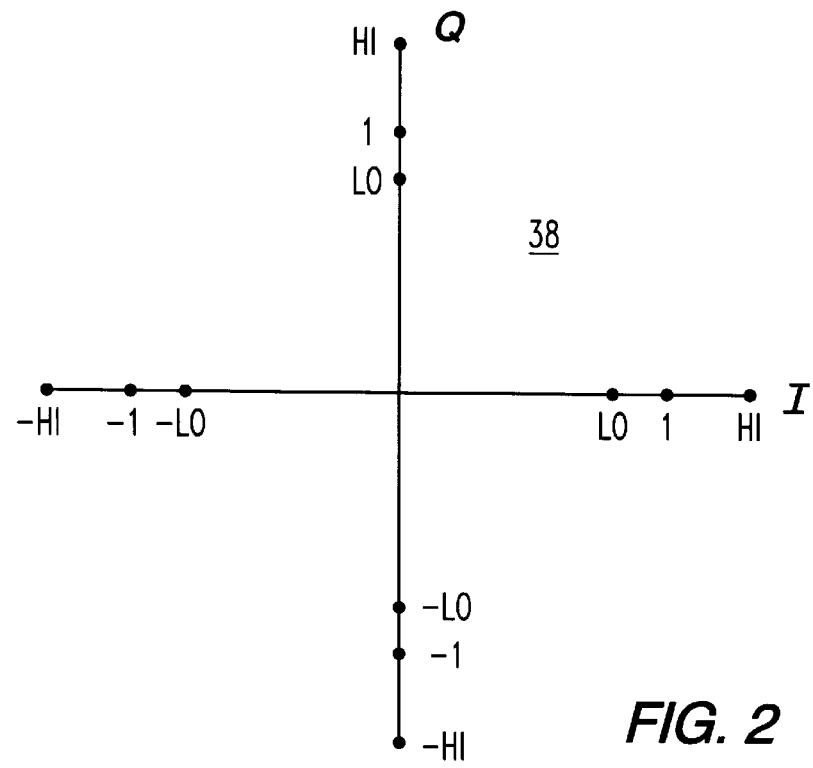
FIG. 2 is plot of a signal constellation which may be used in the transmission of audio and/or data signals in accordance with this invention.

This invention adds amplitude modulation to the coding scheme. Information can be amplitude modulated by assigning values to the sequence m(k). Particularly, an amplitude modulation can be applied to the sequence m(k). In the binary case, two amplitude levels are chosen, HI and LO, such that the average of the squares of the two levels equals 1 (the unmodulated level of m(k)). Then $LO^2 + HI^2 = 2$. This relationship maintains the same signal power as the unmodulated case (assuming equi-probable binary information). The encoder transmits the LO binary level when the information is a binary "0", and transmits the HI level when the binary information is a "1". The constellation 38 (complex I, Q plot of detected signal) of ASK over QPSK is illustrated in FIG. 2.

The receiver decodes this information by observing the level changes between adjacent sub-carrier symbols |x(k)| and |x(k−1)|, since is assumed that the difference between a(k) and a(k−1) is negligible. In the presence of noise and selective fading, the receiver may set thresholds to make the decision whether the amplitude has changed, or remained the same. One particular method for decoding is described below.

For example, if the previous symbol was decoded as a "0", then the decoder observes the next symbol to determine if the amplitude has either remained the same or has increased. Ideally, the threshold should be near the midpoint of the expected value of the HI and LO levels of m(k) multiplied by the channel gain a(k). Selective fading complicates the determination of this threshold. One set of decoding rules is described as follows:

if $|x(k-1)|$ is decoded as "0"

then if $|x(k)| < |(k-1)| \cdot \left[\dfrac{1 + HI/LO}{2}\right]$ then $|x(k-1)|$ is decoded as "0"

else $|x(k-1)|$ is decoded as "1"

else if $|x(k)| < |x(k-1)| \cdot \left[\dfrac{1 + LO/HI}{2}\right]$ then $|x(k-1)|$ is decoded as "0"

else $|x(k-1)|$ is decoded as "1"

It should be pointed out that this set of decoding rules is sub-optimum. For example, once a decoding error has occurred due to noise, the decision rule for the next bit is no longer appropriate. Therefore it is recommended that both hypotheses be tested for each decision rule followed by some sort of arbitration when conflicting decisions are made. Ideally the probability distribution of the noise and the fading could be considered in an optimum decision rule; however, a simple error conflict could be resolved by correcting the conflicting decision that was made with the least margin over the threshold. For the situation where the signal-to-noise ratio (SNR) is high and the channel amplitude is more of a problem due to selective fading, the optimum thresholds approach the geometric mean of the HI and LO levels.

The loss in effective SNR of the existing PSK signal at the receiver due to the ASK modulation can made arbitrarily small by making the values of HI and LO arbitrarily close to 1 at the expense of reduced performance of the ASK modulation. The computation on the loss in PSK performance can be lower-bounded by assuming that the PSK receiver signal is scaled by LO (worst case). The differential detection would experience this loss ¼ of the time when two successive symbols are both at level LO. The loss in SNR is then 20·log(LO) dB, where the scaling factor is 20 instead of 10 since the value of LO is squared in the differential detection. For example, if we set $$LO = 0.75, HI = \sqrt{2 - LO^2} \cong 1.2$$

then the SNR loss of the QPSK system is negligible for ½ of the bits, a loss of 2.5 dB occurs for ¼ of the bits, and a gain of 1.58 dB occurs for the remaining ¼ of the bits.

In a QPSK system, the uncoded capacity is increased by 50% since 3 bits per symbol are transmitted instead of 2. For the case of an FM IBOC DAB system currently under development for the assignee, the uncoded symbol rate is 130921.875 bps. Then additional transparent capacity is about 52 kbps after rate ⅔ FEC coding.

The addition of amplitude modulation over quadrature phase shift modulation can be optional and nearly transparent to a QPSK system (receiver). The level of the transparent ASK overlay can be adjusted as a tradeoff between degradation to an existing QPSK system and robustness of the new ASK overlay. The ASK data would not be as robust as the existing QPSK if reasonable values are chosen such as not to degrade the QPSK. If similar coverage to the QPSK is necessary, then the ASK capacity must be reduced to permit additional forward error correction coding overhead.

While the present invention has been described in terms of what is at present believed to be its preferred embodiment, it should be under stood that various changes can be made in the described method without departing from the invention as defined by the following claims.

What is claimed is:

1. A method of broadcasting digitally encoded information, said method comprising the steps of:

generating a plurality of orthogonal frequency division multiplexed sub-carriers;

producing a digitally encoded signal representative of data to be transmitted, said digitally encoded signal including a plurality of symbols having pulse shapes s(t) defined as $$s(t) = \sum_{k=0}^{K-1} a(k) \cdot m(k) \cdot e^{j(2 \cdot \pi \cdot k \cdot f_s t + \theta(k) + d(k) \cdot \pi/2)} \cdot p(t),$$

where k is a sub-carrier index, p(t) is a pulse shape, a(k) is an amplitude scaling factor, θ(k) is a phase angle, $f_s$ is a sub-carrier spacing, and m(k) is an amplitude modulation factor, said phase angle and said amplitude modulation factor being varied in response to the signal to be transmitted;

modulating said plurality of sub-carriers with said digitally encoded signal; and broadcasting said plurality of sub-carriers.

2. The method of claim 1, wherein m(k) varies between two levels.

3. The method of claim 1, wherein said modulating step differentially imposes portions of the digitally encoded signal across said sub-carriers.

4. The method of claim 1, further comprising the steps of:
   receiving said plurality of sub-carriers;
   demodulating said plurality of sub-carriers to recover said digitally encoded signal; and
   decoding said digitally encoded signal.

5. The method of claim 3, wherein the step of decoding comprises the steps of:
   pulse shaping the digitally encoded signal to produce a pulse shaped signal;
   performing a fast Fourier transform of said pulse shaped signal to produce a code sequence;
   differentially detecting the code sequence to produce an output sequence; and
   determining a change in level between adjacent symbols in said output sequence to obtain data represented by amplitude modulation.

6. A transmitter for transmitting digitally encoded information, said transmitter comprising:

means for generating a plurality of orthogonal frequency division multiplexed sub-carriers;

means for producing a digitally encoded signal representative of data to be transmitted, said digitally encoded signal including a plurality of symbols having pulse shapes s(t) defined as $$s(t) = \sum_{k=0}^{K-1} a(k) \cdot m(k) \cdot e^{j(2 \cdot \pi \cdot k \cdot f_s t + \theta(k) + d(k) \cdot \pi/2)} \cdot p(t),$$

where k is a sub-carrier index, p(t) is a pulse shape, a(k) is an amplitude scaling factor, θ(k) is a phase angle, $f_s$ is a sub-carrier spacing, and m(k) is an amplitude modulation factor, said phase angle and said amplitude modulation factor being varied in response to the signal to be transmitted;

means for modulating said plurality of sub-carriers with said digitally encoded signal; and means for broadcasting said plurality of sub-carriers.

7. A receiver for receiving digitally encoded information, said receiver comprising:

means for receiving a plurality of orthogonal frequency division multiplexed sub-carriers, said sub-carriers being modulated by a digitally encoded signal representative of data to be transmitted, said digitally encoded signal including a plurality of symbols having pulse shapes s(t) defined as $$s(t) = \sum_{k=0}^{K-1} a(k) \cdot m(k) \cdot e^{j(2 \cdot \pi \cdot k \cdot f_s t + \theta(k) + d(k) \cdot \pi/2)} \cdot p(t),$$

where k is a sub-carrier index, p(t) is a pulse shape, a(k) is an amplitude scaling factor, θ(k) is a phase angle, $f_s$ is a sub-carrier spacing, and m(k) is an amplitude modulation factor, said phase angle and said amplitude modulation factor being varied in response to the signal to be transmitted;

means for demodulating said plurality of sub-carriers to retrieve said digitally encoded signal;

means for decoding said digitally encoded signal; and means for producing an output in response to said digitally encoded signal.

\* \* \* \* \*